United States Patent [19]
Rice

[11] Patent Number: 5,151,124
[45] Date of Patent: Sep. 29, 1992

[54] METHOD FOR FORMING AGGREGATED KAOLIN PIGMENT

[75] Inventor: C. Arlyn Rice, Sandersville, Ga.

[73] Assignee: ECC America Inc., Atlanta, Ga.

[21] Appl. No.: 532,598

[22] Filed: Jun. 4, 1990

[51] Int. Cl.⁵ .............................................. C04B 14/00
[52] U.S. Cl. ..................................... 106/416; 106/463; 106/461; 106/468; 106/486; 106/632; 501/144; 501/145; 501/150; 427/361; 427/391
[58] Field of Search ............... 106/416, 463, 464, 468, 106/486, 632; 501/149, 150; 427/361, 391

[56] References Cited

U.S. PATENT DOCUMENTS 4,812,299  3/1989  Wason .................................. 423/328
4,816,074  3/1989  Raythatha .......................... 106/468

Primary Examiner—Mark L. Bell
Assistant Examiner—Michael Marcheschi
Attorney, Agent, or Firm—Klauber & Jackson

[57] ABSTRACT

A method for forming a hydrothermally aggregated kaolin clay pigment, comprising: preparing an aqueous slurry of a particulate kaolin clay, sodium silicate, and finely divided calcium carbonate, having a total solids concentration of from about 10 to 20% by weight; the non-aqueous components including 60 to 80 parts per hundred by weight of said kaolin and from 10 to 20 pph by weight each of said sodium silicate and said calcium carbonate; and hydrothermally treating said slurry in a closed system to form aggregates of adherent kaolin platelets.

8 Claims, 2 Drawing Sheets

PARTICLE SIZE DISTRIBUTION ns display high porosity, 10
METHOD FOR FORMING AGGREGATED KAOLIN PIGMENT

FIELD OF THE INVENTION

This invention relates generally to a method for preparing aggregated pigments from kaolin clays by relatively low temperature hydrothermal treatment; and more specifically relates to such a method, wherein the resulting aggregated pigments display high porosity, rendering them highly useful in paper filling and coating compositions.

BACKGROUND OF THE INVENTION

Hydrothermal treatment of kaolin clays to produce modified products of various types, has been known for many years, and is widely described in the prior art technical and patent literature The reaction of sodium silicate with kaolin clays, for example, has been studied under various hydrothermal conditions, as reported by *Kurbus et al, Z. Anogo. Allg. Chem.*, 1977, Volume 429, pages 156–161. In *Kurbus et al* these reactions were thus studied under hydrothermal conditions using essentially equivalent molar ratios of the kaolin and sodium silicate with the reaction being carried out in an autoclave. The products of the reactions, as identified by x-ray, electron microscope, and infrared methods, showed that sodium silicate reacts with kaolin to form an alumino-silica gel or a crystallized zeolite mineral analcime of the formula:

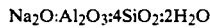

$Na_2O:Al_2O_3:4SiO_2:2H_2O$

In the reaction, the kaolin dissolves and alpha-quartz simultaneously appears in the product of reaction.

U.S. Pat. No. 4,812,299 issued Mar. 14, 1989 to S. K. Wason (assigned to J. M. Huber Corp.) describes compositions designated as synthetic alkali metal aluminosilicates, or simply SAMS, prepared by the hydrothermal reaction of an alkali metal silicate and kaolin clay. By the term "hydrothermal" it is meant that the reaction is carried out under aqueous conditions of elevated temperatures and pressures of greater than atmospheric. In a preferred practice of the said process, an aqueous slurry of the starting clay material and the alkali metal silicate is formed, the system is closed, and heat applied to gradually raise the temperature. The reaction is conducted under conditions of agitation. In general, the pressure in the system will range from about 50 to 360 psig at temperatures ranging from about 140 to 250 degrees C. A specifically preferred range of conditions is to operate the process at pressures of 100 to 200 psig and temperatures of 164 to 194 degrees C. The temperatures are preferably correlated to the pressure such as that provided by steam. The reaction time is about 0.25 to 4 hours. After completion of the reaction, heat is removed and the mixture is allowed to cool, after which the system is opened, the product separated by filtration or centrifugation, washed with water, and dried. Spray drying is preferred at inlet temperatures of 1000° F. (538° C.) and outlet temperature of 250° F. (121° C.). The products are defined as structured agglomerates wherein the primary particles comprise altered kaolin clay platelets integrated with one or more adjacent areas of essentially amorphous alkali metal silicate base-kaolin clay reaction products. More specifically, they are described as altered kaolin platelets having an integrated rimmed area of amorphous, non-diffracting alkali metal silicate-kaolin reaction product. The products are said to be useful as reinforcing agents or fillers for papers, paints, plastics and rubber and to have increased opacity and brightness as compared with the starting clay material.

U.S. Pat. No. 4,816,074 issued Mar. 28, 1989 to Rasik H. Raythatha et al, assigned to E.C.C. America Inc., describes a non-hydrothermal process, in which a structured aggregated kaolin pigment is prepared by mixing substantially dry kaolin in particulate form with an aqueous alkali metal silicate to deposit on the surface of the kaolin particles a substantially molecular level of said silicate without formation of silica gel, drying the treated kaolin without calcination and exposing it to an acidic gas. Calcium carbonate may be added to the composition to be treated, as an aggregation enhancing agent. The product is useful as a pigment in the coating or filling of paper. The process serves to aggregate the very fine particles (i.e. the sub 0.25 micrometer particles) present in very fine feeds. Thus, the otherwise large percentages of troublesome extremely fine particles are effectively removed as separate entities, but without the need for separation steps, together with the costly equipment required for such operations.

U.S. Pat. No. 3,765,825 issued Oct. 16, 1973 to V. J. Hurst teaches reducing the viscosity of kaolin clay slurries by hydrothermal treatment. In U.S. Pat. No. 3,769,383 issued Oct. 30, 1973, he teaches hydrothermal treatment of kaolin to produce a variety of alumino-silicate products.

U.S. Pat. No. 4,499,062 issued Feb. 12, 1985 to P. Christophliemk et al (assigned to Henkel) teaches hydrothermal decomposition of industrial waste products such as filter sludge containing aluminum silicate and/or alkali aluminum silicate, by addition of aqueous NaOH solution and sand.

SUMMARY OF THE INVENTION

It may be regarded as an object of the present invention, to provide a process for hydrothermally aggregating a kaolin feed, which can be effectively practiced at moderate temperatures (and pressures), and which results in an aggregated pigment displaying good brightness and very high pore volume, thereby rendering such pigment highly suitable for paper filling and coating applications.

In the practice of the invention an aqueous slurry of particulate kaolin clay and finely ground calcium carbonate is prepared, together with a sodium silicate solution. The total solids concentration of the slurry is from about 10 to 20% by weight. Of the non-aqueous components, the kaolin is present as about 60 to 80 parts per hundred by weight, and the calcium carbonate component and sodium silicate is from 10 to 20 parts per hundred by weight of each. A preferred composition includes by weight about 70 parts per hundred kaolin to about 15 parts per hundred each of the calcium carbonate and sodium silicate. The slurry is hydrothermally treated in a closed system to form aggregates of adherent kaolin platelets. The hydrothermal treatment is generally effected at temperatures of from about 160° to 300° C., with a more preferable temperature being in the range of from about 170° to 200° C. The advantages of the invention are fully attained at even the lower end of this range, and accordingly there is no need (or advantage) in the use of wasteful higher temperatures. Pressure conditions in the closed system correspond to saturated steam at the temperature utilized.

The slurry is subjected to mixing during the hydrothermal treatment, with such treatment being carried out for from about 0.25 to 3.0 hours; and preferably for from about 1.0 to 1.5 hours.

Wide varieties of clays can be processed including inferior, low grade clays which may be unsuitable for calcination. Discolored clays having low brightnesses can also be used as feed for the present processes, and unexpectedly brightened pigments are thereby yielded. The pigments formed by the invention will typically have a pore volume volume of at least 1.2 cm$^3$/g and a G.E. Brightness of at least 88.

In order to provide the full benefits of the invention, i.e. an aggregated pigment suitable for paper filling and/or coating applications. The kaolin feed material used in the process should be of a very fine particle size generally at least 90% by weight <1 μm. Coarser feeds can also be aggregated where the products are intended for other uses where high pore volume is of interest.

The particulate calcium carbonate used is preferably very finely divided. Preferably such material should have a particle size distribution (PSD) such that at least 90% by weight thereof is of less than 1 micrometer equivalent spherical diameter (ESD). The calcium carbonate appears to function in the present process as to markedly increase the porosity of the aggregates, whereby such desirable characteristics as light scatter are enhanced.

DESCRIPTION OF PREFERRED EMBODIMENT

Practice of the present invention will now be illustrated by Examples which are deemed illustrative of both the process taught by the present invention, and of the products yielded in accordance with the invention:

EXAMPLE 1

A mixture containing 105 grams of a beneficiated and classified grey kaolin feed whose particles are 90% by weight less than 0.5 micrometers, 30 grams of a particulate calcium carbonate having over 95% <1 μm (the CARBITAL 95 product of Atlantic Carbonates, Inc.), and 59 grams of sodium silicate added as a 38% water solution, and a total of 1320 grams of water, was heated in a 2 liter Parr high pressure reactor vessel until the reactor's temperature of 170° C. was reached. This temperature was held for 50 minutes with stirring at 2500 rpm, at which time the reactor was cooled to room temperature by circulating cool water through a coil built into the reactor.

Figure 1:
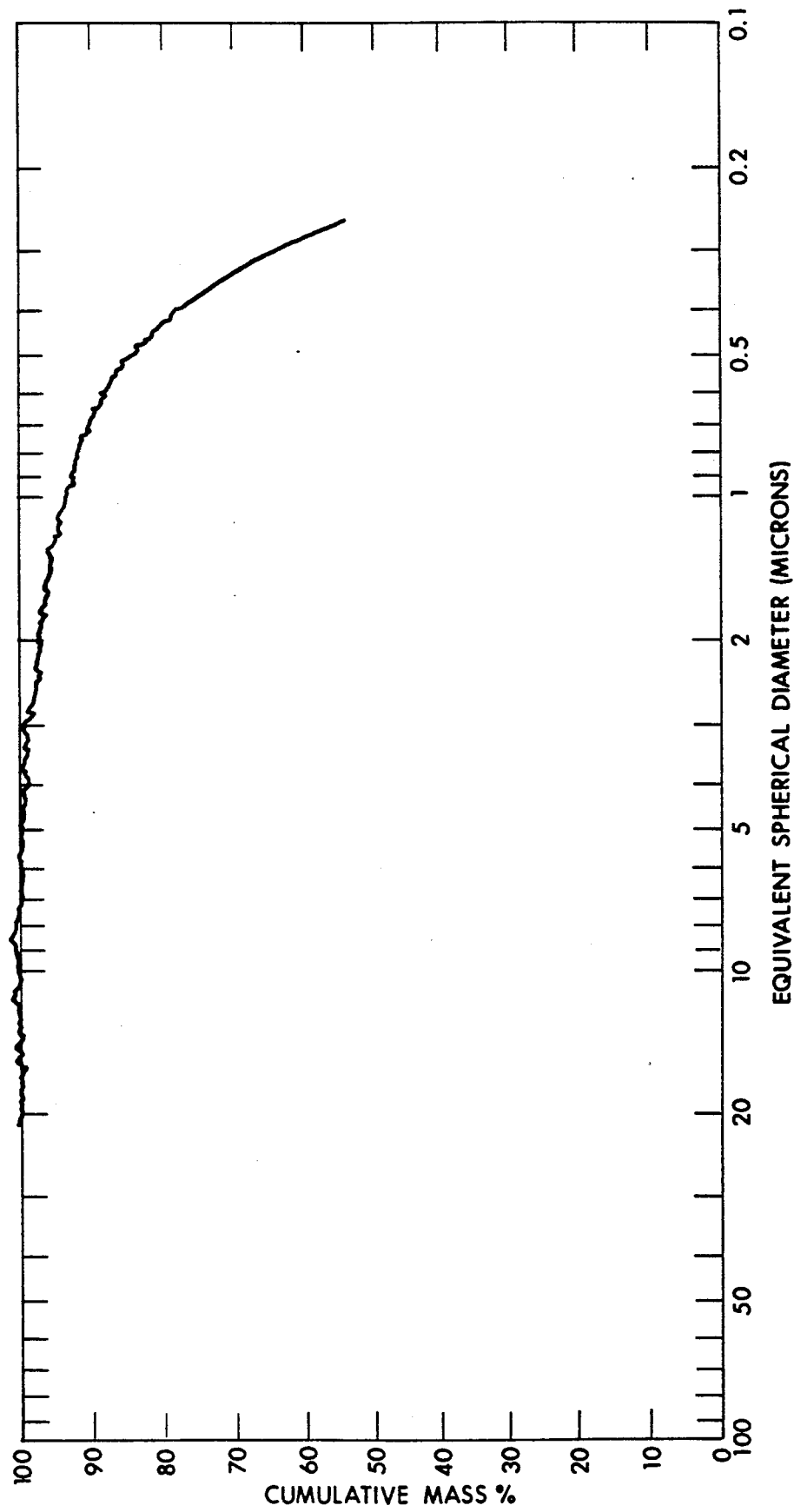
FIG. 1 is a PSD curve for the feed material used in Example 1.
Figure 2:
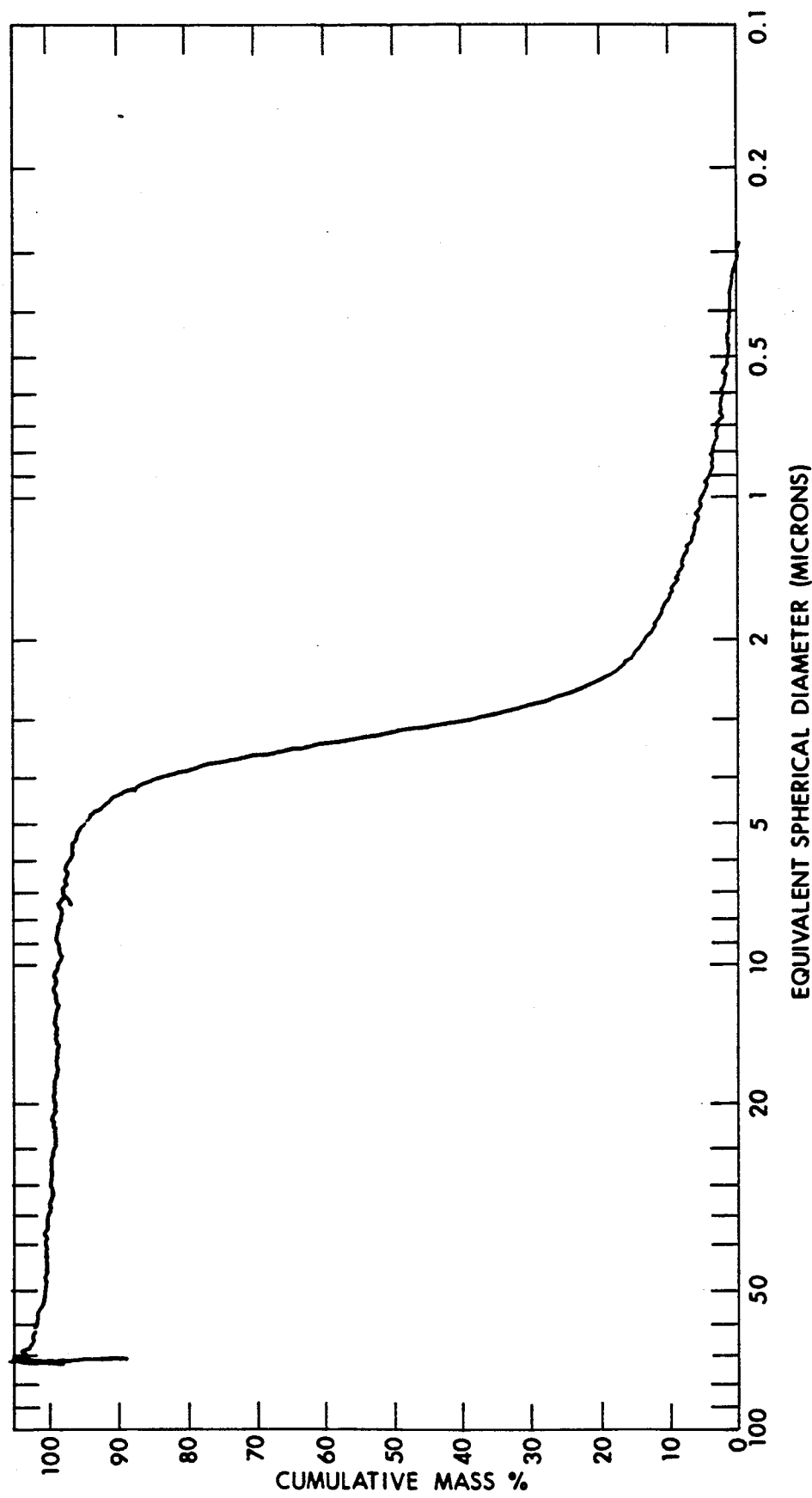
FIG. 2 is a particle size distribution (PSD) curve for the product of Example 1 herein.

The product was removed from the reactor, filtered on a No. 4 Whatman filter paper and dried overnight at 110° C. in a circulating air oven. The dried product was pulverized three times using a Raymond mill. The resulting aggregated product had an average particle size of 3.2 μm which is considerably altered from the original unaggregated material (which by weight was about 50%<¼ μm). Particle size distribution (PSD) curves of the starting feed material and final material are given in FIGS. 1 and 2. The porosity of the aggregated material was determined by mercury porosimetry measurements, as 1.3 g/cm$^3$.

EXAMPLE 2

A mixture containing 120 grams of the same kaolin feed as described in Example 1, 20 g of CARBITAL 95, and 40 g sodium silicate added as a 38% water solution (VSA-38, Vinings Industries, Atlanta, Georgia) and a total of 1414 grams of water was heated to 170° C. in a 2 liter Parr high pressure reactor and the 170° C. temperature maintained with stirring at 2500 rpm for 50 minutes. The reactor was cooled and the product treated as described in Example 1. The pulverized aggregate was analyzed for changes in particle size distribution and compared to the starting material The resulting product was significantly altered from its original state. The aggregated material thus had an average particle size of 2.5 μm as compared to an average particle size of <0.25 μm for the feed material. Porosity was measured as 1.3 cm$^3$/g. Porosity of the feed material was 0.39 cm$^3$/g.

EXAMPLE 3

The procedure of Example 1 was repeated, using however a reaction temperature of 230° C. for 50 minutes Brightness of the feed material was increased during the process from 78 GE to 88.6 GE (TAPPI Procedure T-646 OS-75). The average particle size of the product was 3.6 μm, wherein the average particle size of the feed kaolin was about 0.25 μm. The pore volume of the product was 1.36 cm$^3$/g compared to 0.39 cm$^3$ for the feed material.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. A method for forming a hydrothermally aggregated kaolin clay pigment, comprising: preparing an aqueous slurry of a particulate kaolin clay, sodium silicate, and finely divided calcium carbonate, having a total solids concentration of from about 10 to 20% by weight; the non-aqueous components including 60 to 80 parts per hundred by weight of said kaolin and from 10 to 20 pph by weight each of said sodium silicate and said calcium carbonate; and hydrothermally treating said slurry in a closed system to form aggregates of adherent kaolin platelets.

2. A method in accordance with claim 1, wherein said hydrothermal treatment is effected at temperatures of from about 160° to 300° C.

3. A method in accordance with claim 2, wherein said hydrothermal treatment is effected at temperatures of from about 170° C. to 200° C.

4. A method in accordance with claim 3, wherein said slurry is subjected to mixing during said hydrothermal treatment.

5. A method in accordance with claim 3, wherein said hydrothermal treatment is carried out for from about 0.25 to 3.0 hours.

6. A method in accordance with claim 5, wherein said hydrothermal treatment is carried out for from about 1.0 to 1.5 hours.

7. A method in accordance with claim 1, wherein said sodium silicate is added in the form of a sodium silicate solution.

8. A method in accordance with claim 1, further including recovering and drying said aggregates.

* * * * *